W. CLEMSON.
Saws.
No. 147,609. Patented Feb. 17, 1874.
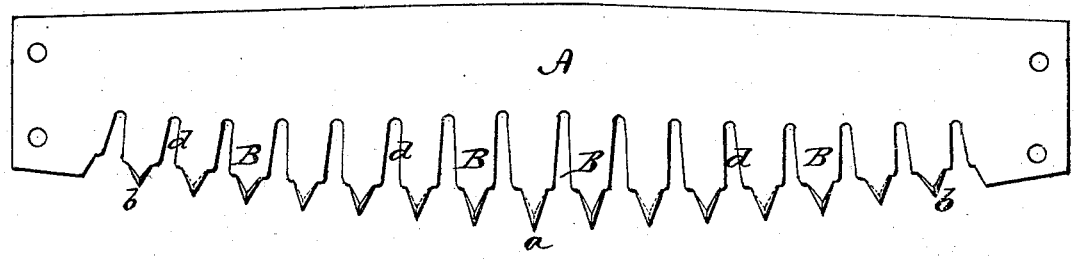
WITNESSES:
P. C. Dieterich
H. C. Scott
INVENTOR
William Clemson
per
C. H. Wertsough
ATTORNEYS.

UNITED STATES PATENT OFFICE.

WILLIAM CLEMSON, OF MIDDLETOWN, NEW YORK.

IMPROVEMENT IN SAWS.

Specification forming part of Letters Patent No. 147,609, dated February 17, 1874; application filed January 26, 1874.

*To all whom it may concern:*

Be it known that I, WILLIAM CLEMSON, of Middletown, in the county of Orange and State of New York, have invented certain new and useful Improvements in Saws; and I do hereby declare that the following is a full, clear, and exact description thereof, reference being had to the accompanying drawings, and to the letters of reference marked thereon, which form a part of this specification.

My invention relates to crosscut-saws; and it consists in forming or cutting the teeth with graduated angles from the middle toward both ends, and also in graduated dust-spaces between the teeth, all of which will be hereinafter more fully set forth.

In order to enable others skilled in the art to which my invention appertains to make and use the same, I will now proceed to describe its construction and operation, referring to the annexed drawing, which represents a side view of a crosscut-saw embodying my invention.

A represents the blade, and B B the teeth, of a crosscut-saw. The teeth are of the usual form, but are graduated from the middle toward both ends in the following particulars: The teeth are the longest in the middle, and gradually decrease in length toward the ends; likewise the distance between the points of the teeth decreases gradually, very slowly, toward the ends. The points at the middle form an acute angle, as shown at $a$, the size of which increases toward both ends where the angles of the points are more obtuse, as shown at $b$. The object of this is to have the saw cut very freely in the middle, and to slow off gradually as the work approaches the ends, as it is found that, the ends of the saw being so much narrower than the middle, the saw will not bear pushing when the teeth are cutting as freely there without bending the plate, and so retarding the operation of the saw.

The obtuse points of the end teeth permit them to penetrate less easily into the wood, which allows the saw to stop and start freely at the end of each stroke, but requires of both operators increased exertion while the center of the saw is passing through the log, and also while their arms and bodies are in the best position to use their strength to the best advantage and greatest ease to themselves. This advantage is secured and retained without any complicated and difficult method of filing or setting, as these teeth are dressed in the usual manner of fleam-teeth—that most generally understood and most easily done.

To prevent undue friction from the sawdust on the sides of the plate, I cut in taper sawdust-spaces $d$ $d$ above the bases of the teeth, proportionate in area to the amount of work each tooth will do, or is capable of doing. The space $d$ is purposely made narrow and tapering, it being narrowest at its termination to prevent the teeth from vibrating, and tapering so that the dust will discharge freely from them, and as deep as possible to allow the sawdust to work in, a portion of which will rise above the bases of ordinary saw-teeth, and cause either unnecessary friction or the cutting of an unnecessarily wide kerf to prevent it. The tapering slot makes the tooth stronger, and also has a tendency to incline the particles of wood (which are thrown upward by rapid motion of the saw) downward, and thus more effectually act as clearers.

From this arrangement accrues also the advantage that saws of much higher temper can be used and set without danger from breaking teeth.

Having thus fully described my invention, what I claim as new, and desire to secure by Letters Patent, is—

1. The graduated saw-teeth B B, having the angles of their points graduated from an acute angle, $a$, at the middle to an obtuse angle, $b$, at each end, substantially as and for the purposes herein set forth.

2. A crosscut-saw combining the features of graduated teeth with graduated angles of their points, and tapering graduated sawdust-spaces between the teeth, substantially as and for the purposes herein set forth.

In testimony that I claim the foregoing as my own I affix my signature in presence of two witnesses.

WM. CLEMSON.

Witnesses:
WILLIAM MILLSPAUGH,
EDWARD M. MADDEN, Jr.